US006614554B1

(12) United States Patent
Yokoi

(10) Patent No.: US 6,614,554 B1
(45) Date of Patent: Sep. 2, 2003

(54) RECORDING APPARATUS AND METHOD OF CONTROLLING RECORDING APPARATUS

(75) Inventor: Katsuyuki Yokoi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/399,812

(22) Filed: Sep. 21, 1999

(30) Foreign Application Priority Data

Sep. 25, 1998 (JP) .......................................... 10-271573

(51) Int. Cl.[7] ................................................ G06F 15/00

(52) U.S. Cl. .......................... 358/1.8; 358/1.7; 358/1.9; 347/11; 347/14; 347/8

(58) Field of Search .......................... 358/1.8, 1.9, 1.7; 400/279; 347/14, 8, 11

(56) References Cited

U.S. PATENT DOCUMENTS 5,204,695 A * 4/1993 Tokunaga et al. ............. 347/11
5,576,744 A * 11/1996 Nikura et al. ................. 347/14
5,873,663 A 2/1999 Yokoi et al. ................ 400/279

* cited by examiner

*Primary Examiner*—Mark Wallerson
*Assistant Examiner*—Twyler Lamb
(74) *Attorney, Agent, or Firm*—Fitzpatrick, Cella, Harper & Scinto

(57) ABSTRACT

The present invention attempts to minimize irregularity in recording caused by a variation in transport of a carriage. One of a plurality of kinds of timing, according to which a recording signal is applied, set relative to a signal indicating the position of the carriage is selected in order to record data.

17 Claims, 16 Drawing Sheets

RECORDING APPARATUS AND METHOD OF CONTROLLING RECORDING APPARATUS

BACKGROUND OF THE INVENTION

1. Field of the Invention

The present invention relates to a recording apparatus (printer) serving as an information output apparatus to be connected to, for example, a computer. Additionally, the present invention relates to a recording apparatus, incorporated in an image formation system such as a copier or facsimile system, for recording data on a recording medium using a means such as a recording head.

2. Description of the Related Art

Recording apparatuses record data by forming record dots on a recording medium. A so-called serial printer has a recording head, a carriage, a carriage motor, a carriage belt, and a recording medium transporting means. The recording head has recording means, which form record dots on a recording medium, arranged with a predetermined pitch between adjoining dots. The carriage has the recording head mounted thereon and moves in a direction of main scanning. The carriage motor is used to drive the carriage. The carriage belt is used to convey drive exerted by the carriage motor to the carriage. The recording medium transporting means transports a recording medium on which data is recorded by the recording head.

In general, for moving the carriage, on which the recording head is mounted, in the direction of main scanning, the endless belt partly engaged with the carriage is laid between a motor pulley and idler pulley put on the axis of rotation of the carriage motor. The motor pulley and idler pulley are placed in the direction of main scanning with a certain distance between them. The endless belt is moved with a driving force exerted by the carriage motor.

A pulse motor or a DC motor with a rotary encoder is used as the carriage motor.

For calculating the position of the recording head on the recording medium during a main scan, for example, driving pulses applied to the carriage motor are used to determine the timing of driving the recording means in the recording head.

FIG. 14 shows an example of driving pulses, wherein a pulse motor is used as the carriage motor. An angle by which the pulse motor rotates responsively to one pulse is determined. A distance by which the carriage moves responsively to one pulse can therefore be set by specifying the diameter of the motor pulley put on the axis of rotation. In this example, the carriage can move a distance covering two dots on the recording medium responsively to one pulse applied to the carriage motor.

A recording signal used to drive the recording means is set so that the recording pulse will be generated twice between generations of the motor driving pulse.

The first recording pulse is generated simultaneously with the motor driving pulse. Generation of the second recording pulse is delayed by a predetermined time from generation of the first recording pulse using a timer incorporated in a control circuit, so that the second recording pulse will be generated between generations of the motor driving pulse.

In other words, the timing of generating the recording pulse is set based on the driving pulse, which is applied to the carriage motor and used to calculate the position of the carriage on the recording medium during a main scan, so that data can be recorded on the recording medium with a uniform distance between adjoining dots.

However, according to the method of determining the timing of recording by driving the carriage using the motor, there are various factors causing irregularity in the moving speed at which the carriage is moved. The irregularity in the moving speed occurs at the same phase in the direction of main scanning on the recording medium. This leads to irregularities in an image formed on the recorded image. Thus, the method has a drawback that should be overcome.

For example, the pulse motor has several phase positions (normally, four phase positions), to which a driving pulse is applied, defined therein. The driving pulse is applied sequentially to the phase positions, whereby a torque is produced.

An irregularity in rotation occurs at regular intervals due to a difference in magnetic force generated with input of the driving pulse to one phase position or a difference in precision of an angle defined by each of the four phase positions and an adjoining one.

In other words, even when the motor driving pulse is input at regular intervals, a lag or lead in an angle of rotation occurs with input of every fourth pulse. This causes the position of the carriage to slightly deviate from an intended position. Recording is repeated in this state. Consequently, a stripe pattern is drawn in a record image on the recording medium.

FIG. 15, FIG. 16, and FIG. 17 show how the stripe pattern is drawn.

FIG. 15 shows a deviation of a dot from a predetermined position occurring when a recording signal is produced by the recording means at a predetermined position ($(n/8)\lambda$) (wavelength $\lambda$=8 dots (associated with four motor driving pulses)). Herein, two dots are formed between applications of the driving pulse to the carriage motor.

"LEADING" indicates that each dot is formed at a position that is located downstream of a predetermined position in the direction of main scanning. "LAGGING" indicates that each dot is formed at a position that is located upstream of a predetermined position in the direction of main scanning.

FIG. 16 shows how the deviation of each dot indicated in FIG. 15 appears actually on the recording medium. A deviation Z(X) of each position $X=(n/8)\lambda$ from an ideal position on the recording medium is expressed as follows:

$$Z(X)=A\sin(2\pi(X/\lambda))$$

where A denotes an amplitude.

Thus, a coarse array of dots and a dense array of dots are produced at regular intervals. Factors causing this kind of cyclic irregularity include the foregoing irregularity in rotation of the motor as well as the eccentricity of the motor pulley for conveying drive exerted by the carriage motor to the carriage belt.

FIG. 17 shows record dots formed in a certain area on a recording medium. The coarse and dense array of dots indicated in FIG. 16 appear at regular intervals, whereby a stripe pattern is created in the direction of main scanning.

Even when a multi-pass recording method conventionally utilized as a high-image quality mode is adopted, the relationship between the position of the carriage in the direction of main scanning and a position to which the carriage motor is rotated remains unchanged because the endless belt is used to convey drive. Production of the stripe pattern cannot be prevented. Herein, the multi-pass recording method is a recording method of forming every fifth or sixth dot out of one row of dots during one main scan, and main scanning is performed a plurality of times in order to complete an image.

As mentioned above, the conventional method of determining timing of recording by driving the carriage using the motor has a drawback that irregularity in recording occurs in the direction of main scanning.

For overcoming the foregoing drawbacks, a motor capable of rotating by a precise angle may be used as the carriage motor or the precision of the pulley may be improved. However, taking these measures results in an expensive apparatus.

Even inexpensive serial printers are demanded to be able to record high-definition images these days. There is therefore an increasing demand for a technology of overcoming the irregularity in recording observed in the direction of main scanning by adopting an inexpensive means.

SUMMARY OF THE INVENTION

For solving the foregoing problems, a recording apparatus in accordance with the present invention includes a carriage, a carriage motor, a transporting mechanism, a signal generating means, and a recording signal control means. The carriage scans a recording medium in a direction of main scanning with a recording head mounted thereon. The recording head has a plurality of recording means for forming record dots on the recording medium arranged therein. The carriage motor drives the carriage. The transporting mechanism transports the recording medium in a direction of sub scanning. The signal generating means generates a position signal, based on which the position of the carriage in the direction of main scanning can be calculated, responsively to a movement in the direction of main scanning made by the carriage. The recording signal control means calculates the position in the direction of main scanning of the recording head according to the position signal, and generates the recording signal with which the recording means is driven. The recording apparatus further includes a control means in which a plurality of kinds of timing, according to which the recording signal is generated after generation of the position signal based on which the position in the direction of main scanning of the carriage can be calculated, is set relative to the position signal. Any of the plurality of kinds of timing is selected in order to control the recording signal during a main scan involving the carriage.

Additionally, a recording apparatus includes a carriage, a carriage motor, a transport mechanism, a signal generating means, and a recording signal control means. The carriage scans a recording medium in a direction of main scanning with a recording head mounted thereon. A plurality of recording means for forming record dots on a recording medium is arranged in the recording head. The carriage motor drives the carriage. The transport mechanism transports the recording medium in a direction of sub scanning. The signal generating means generates a position signal, based on which the position in the direction of main scanning of the carriage can be calculated, responsively to a movement in the direction of main scanning made by the carriage. The recording signal control means calculates the position in the direction of main scanning of the recording head according to the position signal, and generates a recording signal used to drive the recording means. The recording apparatus operates in a mode in which main scanning involving the carriage is repeated a plurality of times in order to form an array of record dots in the direction of main scanning. The recording apparatus further includes a control means in which a plurality of kinds of timing, according to which the recording signal is generated after generation of the position signal based on which the position in the direction of main scanning of the carriage can be calculated, is set relative to the position signal. The control means associates the plurality of different kinds of timing with a plurality of main scans required to complete the array of record dots to be formed in the direction of main scanning.

Furthermore, a recording apparatus includes a carriage, a carriage motor, a transport mechanism, a signal generating means, and a recording signal control means. The carriage scans a recording medium in a direction of main scanning with a recording head mounted thereon. A plurality of recording means for forming record dots on a recording medium is arranged in the recording head. The carriage motor drives the carriage. The transport mechanism transports the recording medium in a direction of sub scanning. The signal generating means generates a position signal, based on which the position in the direction of main scanning of the carriage can be calculated, responsively to a movement in the direction of main scanning made by the carriage. The recording signal control means calculates the position in the direction of main scanning of the recording head according to the position signal, and generates one or a plurality of recording signals used to drive the recording means between generations of the signal. The recording apparatus operates in a mode in which main scanning involving the carriage is repeated in order to form an array of record dots in the direction of main scanning. The recording apparatus further includes a control means in which a plurality of kinds of timing, according to which the recording signal is generated after generation of the position signal based on which the position in the direction of main scanning of the carriage can be calculated, is set relative to the position signal. The control means associates the plurality of different kinds of timing with a plurality of main scans required to complete the array of record dots to be formed in the direction of main scanning.

Moreover, a method of controlling a recording apparatus in accordance with the present invention is implemented in a recording apparatus including a carriage, a carriage motor, a transport mechanism, a signal generating means, and a recording signal control means. The carriage scans a recording medium in a direction of main scanning with a recording head mounted thereon. A plurality of recording means for forming record dots on a recording medium is arranged in the recording head. The carriage motor drives the carriage. The transport mechanism transports the recording medium in a direction of sub scanning. The signal generating means generates a position signal, based on which the position in the direction of main scanning of the carriage can be calculated, responsively to a movement in the direction of main scanning made by the carriage. The recording signal control means calculates the position in the direction of main scanning of the recording head according to the position signal, and generates a recording signal used to drive the recording means. One of a plurality of kinds of timing, according to which the recording signal is generated after generation of the position signal based on which the position in the direction of main scanning of the carriage can be calculated and which is set relative to the signal is selected in order to generate the recording signal during the main scan involving the carriage.

Owing to the foregoing configuration, irregularity in recording appearing as streaks or stripes in the direction of main scanning can be suppressed without a rise in costs. Moreover, excellent record images can be produced with high quality.

DESCRIPTION OF THE PREFERRED EMBODIMENTS

Embodiments of the present invention will be described in conjunction with the drawings below. Herein, "recording" mentioned in this specification indicates not only that a meaningful image such as characters or a graphic is drawn on a recording medium but also that a meaningless image such as a pattern is drawn thereon.

First Embodiment

Figure 5:
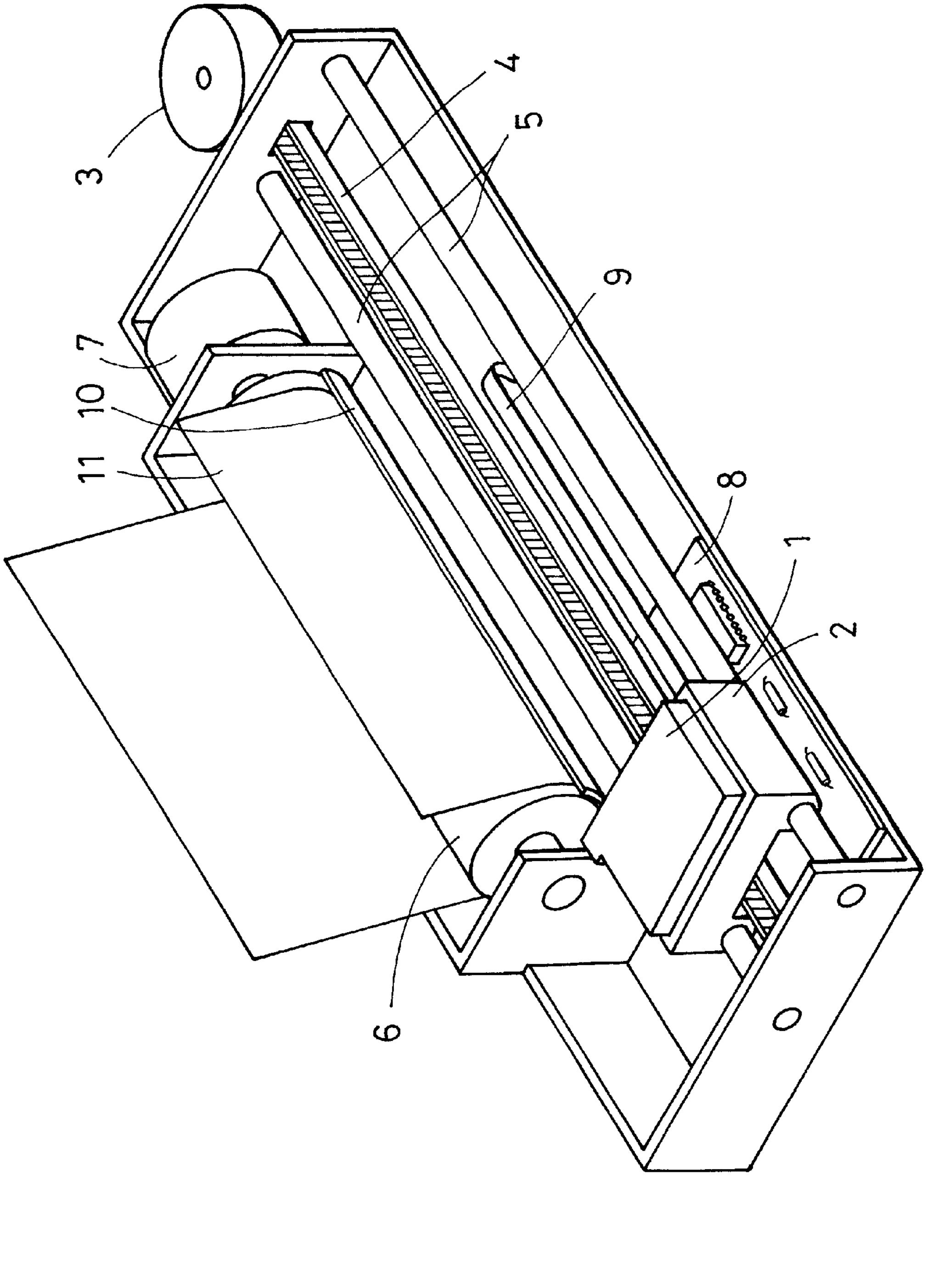
FIG. 5 is an explanatory diagram concerning the outline configuration of a recording apparatus in accordance with the present invention.

FIG. 5 shows the outline configuration of a recording apparatus in which the present invention is implemented.

An ink-jet recording head 1 has recording means for jetting ink arranged with a certain pitch between adjoining dots. A carriage 2 has the recording head 1 mounted thereon and sweeps a recording medium in a direction of main scanning. A carriage motor (hereinafter, CR motor) 3 drives the carriage 2 in directions of scanning. The carriage motor 3 is realized with a stepping motor or a motor in which a unit of driving is specified, such as a motor with an encoder. A carriage belt 4 drives the carriage 2 in the direction of main scanning using driving force exerted by the CR motor 3. Carriage shafts 5 guide the carriage 2 during a main scan. A transport roller 6 transports the recording medium. An LF motor 7 drives the transport roller 6. There is shown a control circuit 8. A driving signal sent from the control circuit 8 is transmitted to the ink-jet recording head 1 mounted on the carriage 2 over a flexible cable 9. A guide member 10 guides the recording medium. There is also shown a recording medium 11.

Figure 6:
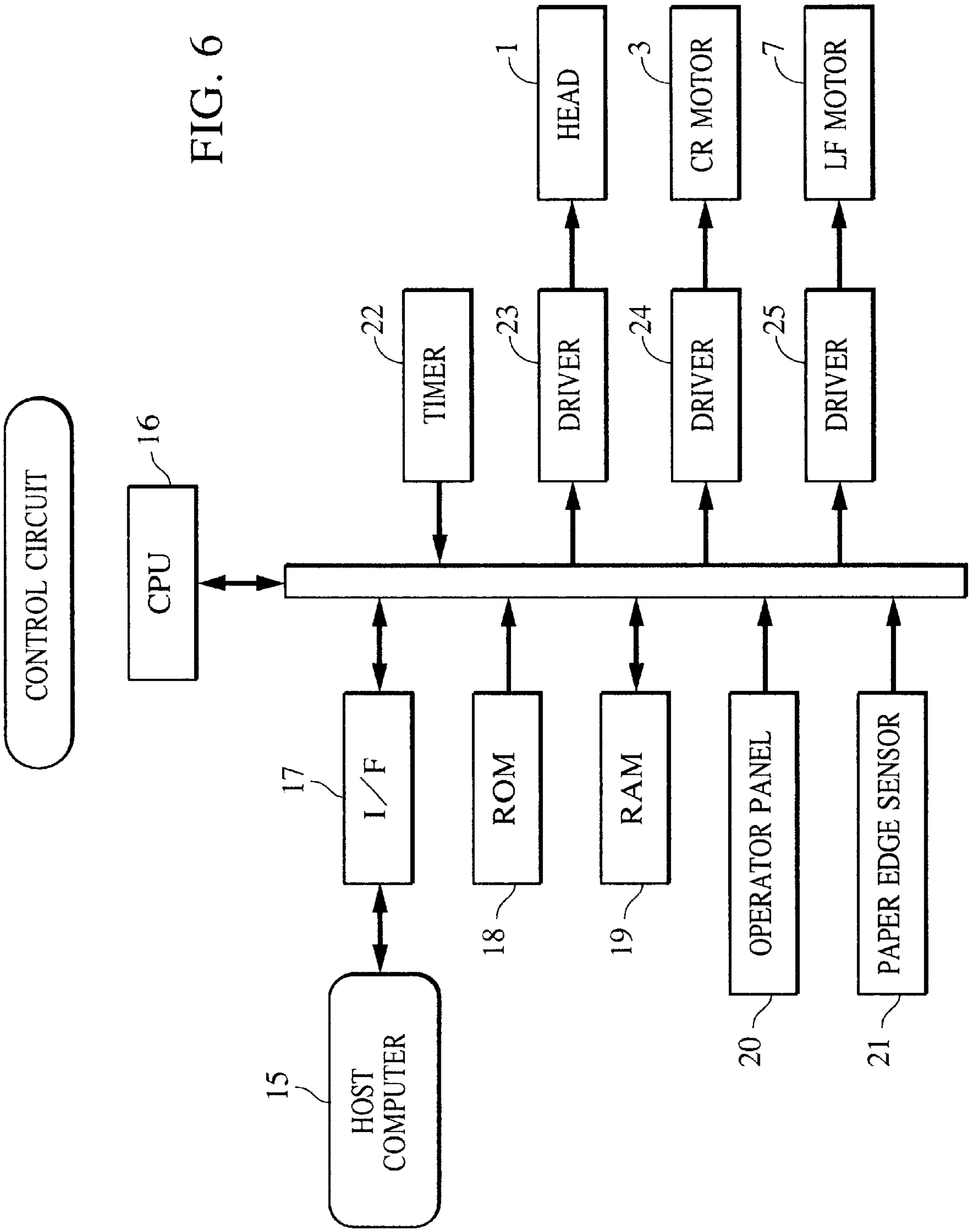
FIG. 6 is a block diagram for explaining the configuration of a control circuit included in the recording apparatus in accordance with the present invention.

FIG. 6 is a block diagram showing the configuration of the control circuit 8.

A CPU 16 realized with a microprocessor is connected to a host computer 15 via an interface 17. The CPU 16 controls a recording operation according to record data sent from the host computer and stored in a program memory 18 realized with a ROM and a buffer memory 19 realized with a RAM.

The CPU 16 controls the CR motor 3 and LF motor 7 via motor drivers 24 and 25 respectively, and controls the recording head 1 via a head driver 23 according to record information stored in the RAM 19. A user uses an operator panel 20 to recognize a state of recording performed by the recording apparatus. A timer 22 provides timing for the control circuit.

Figure 7:
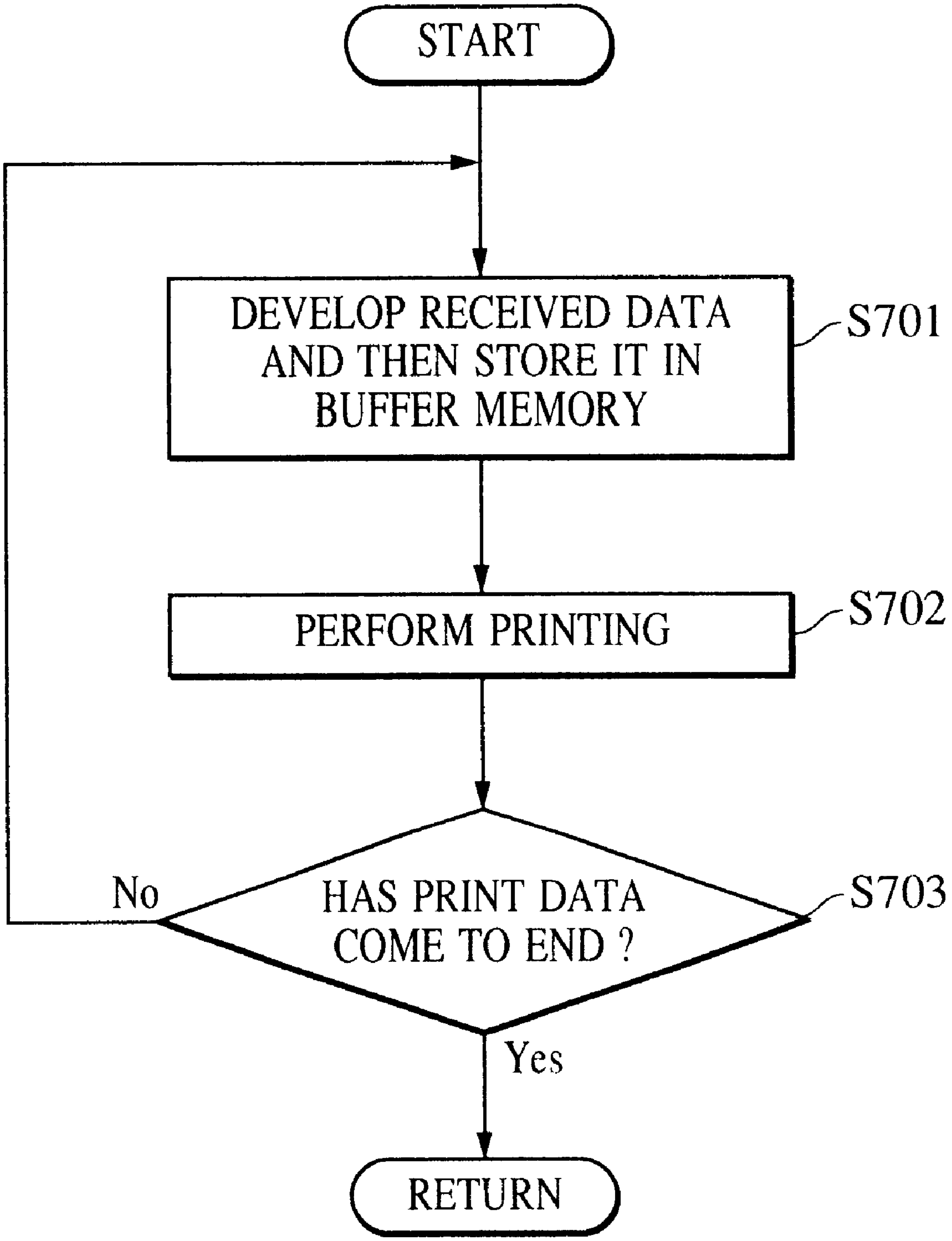
FIG. 7 is an explanatory diagram describing a recording sequence in accordance with the present invention.
Figure 8:
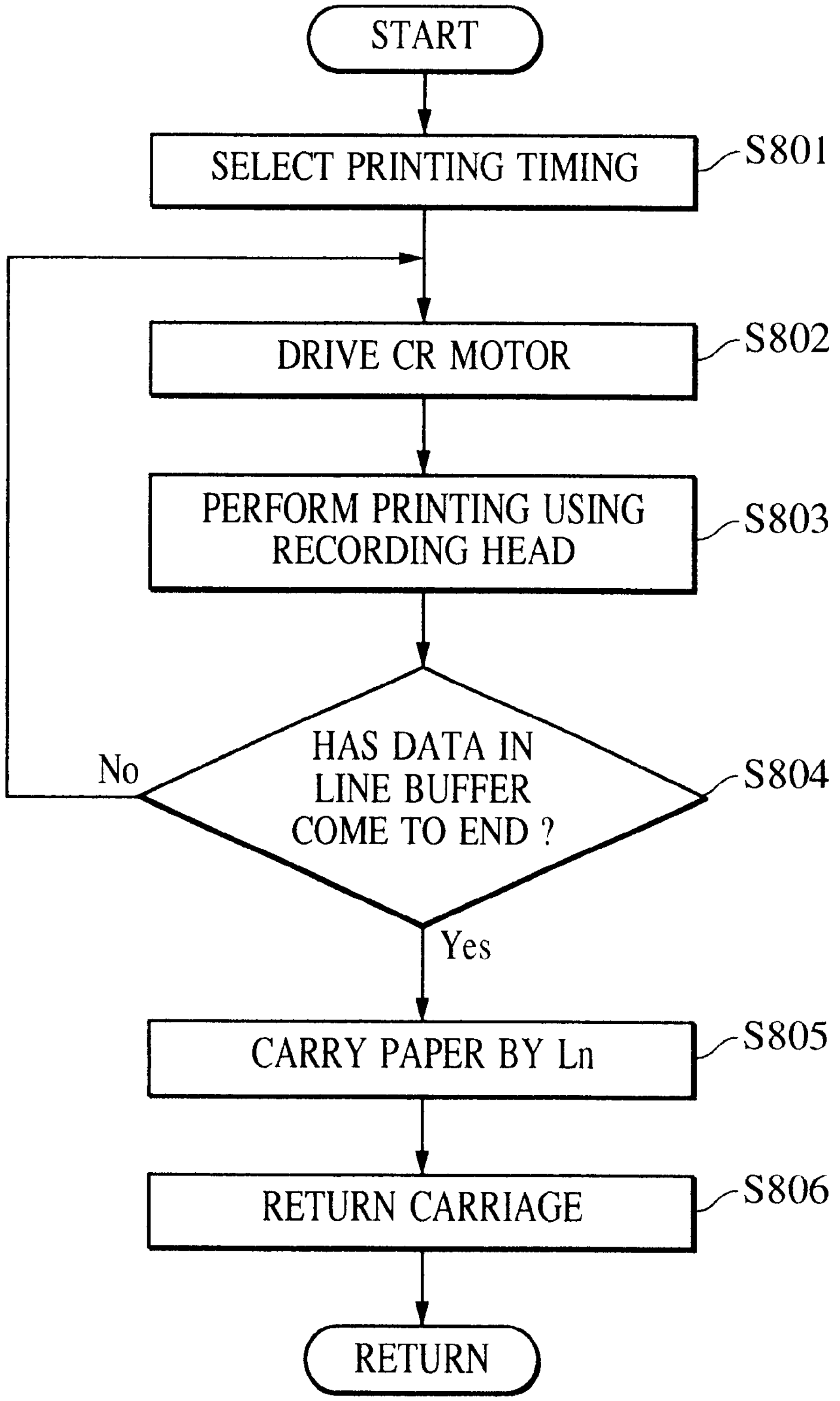
FIG. 8 is an explanatory diagram describing the recording sequence in accordance with the present invention.

FIG. 7 and FIG. 8 describe a basic recording sequence.

A recording signal sent from the host computer 15 is developed so that the recording head 1 can record data according to the recording signal. The resultant recording signal is then placed in the buffer memory realized by the RAM 19 and designed to store data used during one scan (S701).

Thereafter, the CR motor 3 is driven in order to sweep the carriage 2 over the recording medium 11. The ink-jet head 1 mounted on the carriage 2 shoots ink so as to form dots on the recording medium and thus records data (S702). If print data remains, steps S701 and S702 are repeated (S703).

The timing of driving the recording means in the recording head relative to the driving pulse applied to the carriage motor is selected according to a recording mode specified in the recording apparatus before sweeping of the carriage is started S801).

Thereafter, the CR motor is driven in order to sweep the carriage over the recording medium. The ink-jet head 1 mounted on the carriage 2 discharges ink so as to form dots on the recording medium and thus records data (S802 and S803).

When all the record data in a line buffer has been recorded, the LF motor 7 is driven in order to drive the transport roller 6 so that the recording medium will be transported by a predetermined length Ln in the direction of sub scanning (S805).

Thereafter, the carriage is returned to a start position (S806) and recording of data constituting one line is completed. If received data remains, the steps S801 to S803 are repeated.

Figure 9:
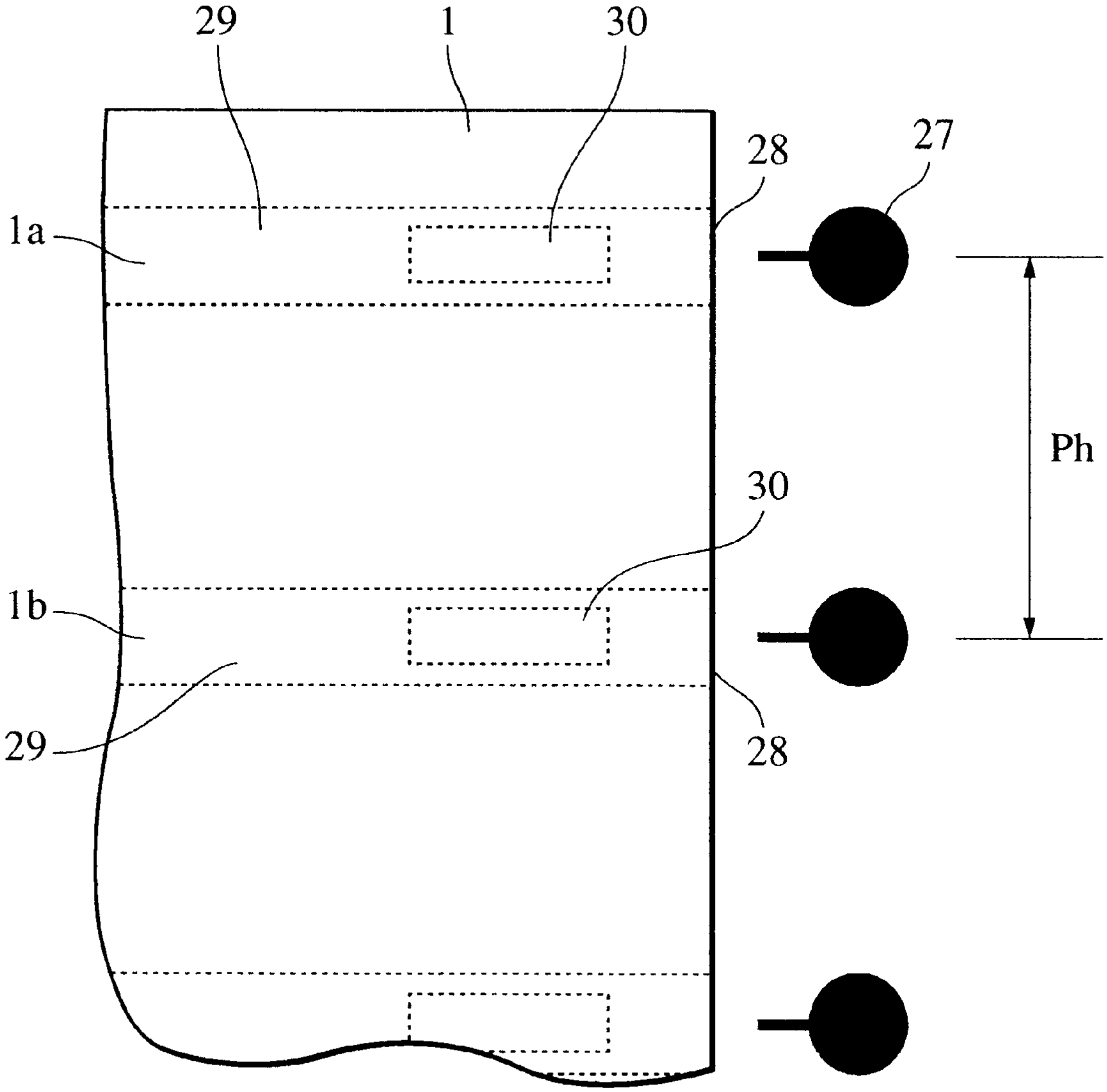
FIG. 9 is an explanatory diagram concerning the structure of an ink-jet recording head in accordance with the present invention, showing ink jet ports and their surroundings.

FIG. 9 is an illustrative enlarged view of ink jet ports and their surroundings in the ink-jet recording head 1.

The recording means, for example, ink jetting means 1*a* and 1*b*, are arranged with a pitch Ph between adjoining ones. Droplets of ink 27 can be jetted with the pitch Ph between adjoining dots during a main scan involving the recording head on the carriage. In other words, record dots having the pitch Ph between them can be formed during one main scan involving the ink-jet recording head.

The ink jetting means each includes an ink jet port 28 through which ink is jetted out, a channel 29 communicating with the ink jet port, and a heating resistor 30 located in the channel for generating heat energy used to jet ink.

Figure 1:
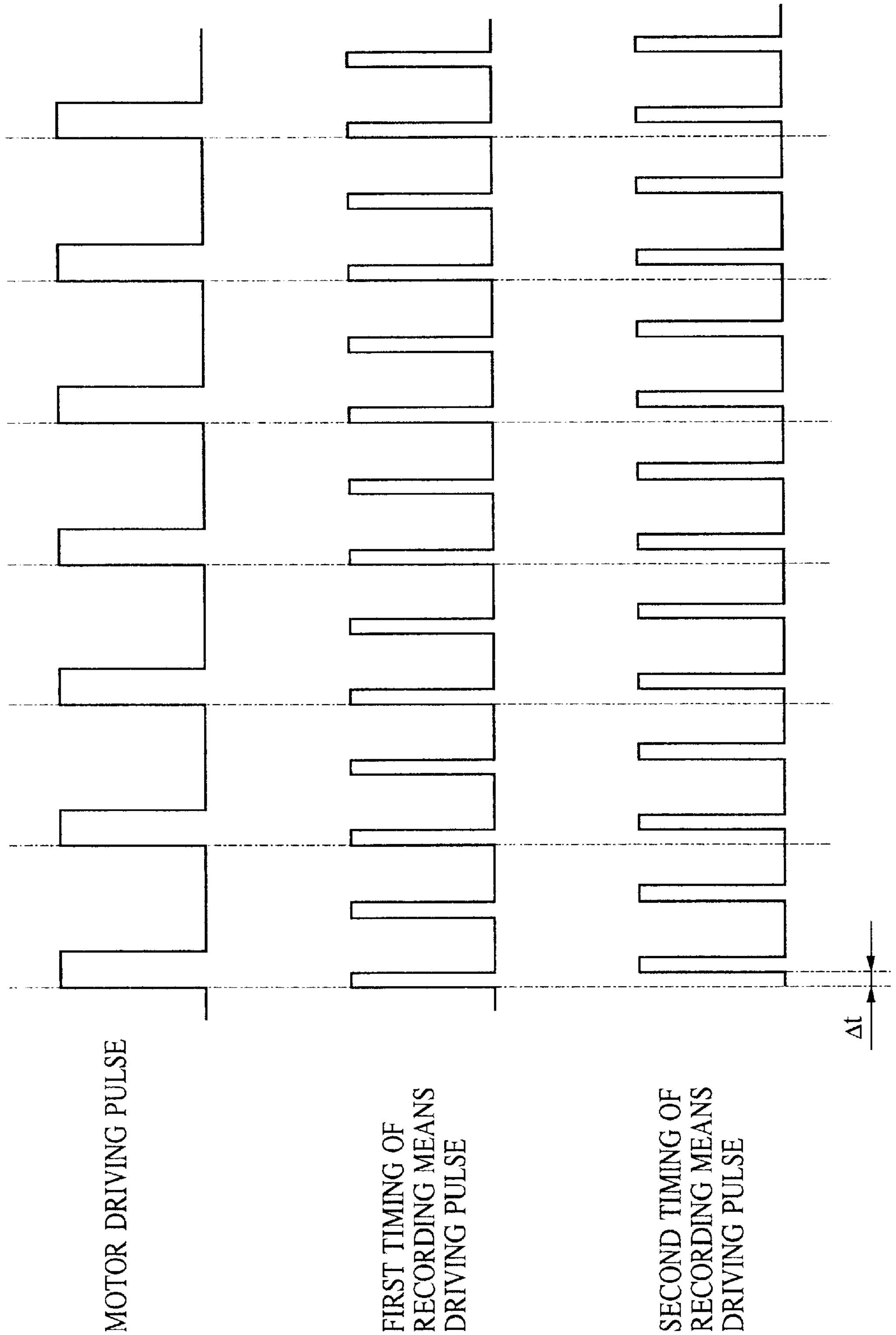
FIG. 1 shows examples of timing relative to a motor driving pulse employed in the first embodiment.

FIG. 1 shows the relationship between two kinds of timing of applying a recording pulse to the recording head relative to a driving pulse applied to the pulse motor serving as the carriage motor.

As illustrated, in the present embodiment, timing of recording is set so that a recording pulse can be applied twice to the recording means in the recording head between applications of a motor driving pulse. Specifically, while the motor rotates by one step to enable main scanning, the recording head can form two dots on a recording medium.

As illustrated, in the present embodiment, two kinds of timing of applying the recording pulse to the recording means in the recording head are set relative to the driving pulse applied to the carriage motor. Specifically, according to the first timing of recording, the recording pulse to be applied to the recording means in the recording head is generated simultaneously with the motor driving pulse. The recording pulse is generated once more between generations of the motor driving pulse. Thus, two recording pulses to be applied to the recording head are generated relative to one driving pulse to be applied to the carriage motor. Consequently, dots can be formed on the recording medium with a uniform distance between adjoining dots. Moreover, according to the second timing of recording, the recording pulse to be applied to the recording head is generated to lag behind the motor driving pulse by a lag time $\Delta t$. The recording pulse is generated once more between generations of the motor driving pulse. Thus, two recording pulses to be applied to the recording head are generated relative to one driving pulse to be applied to the carriage motor. Consequently, dots can be formed on the recording medium with a uniform distance between adjoining dots.

Figure 2:
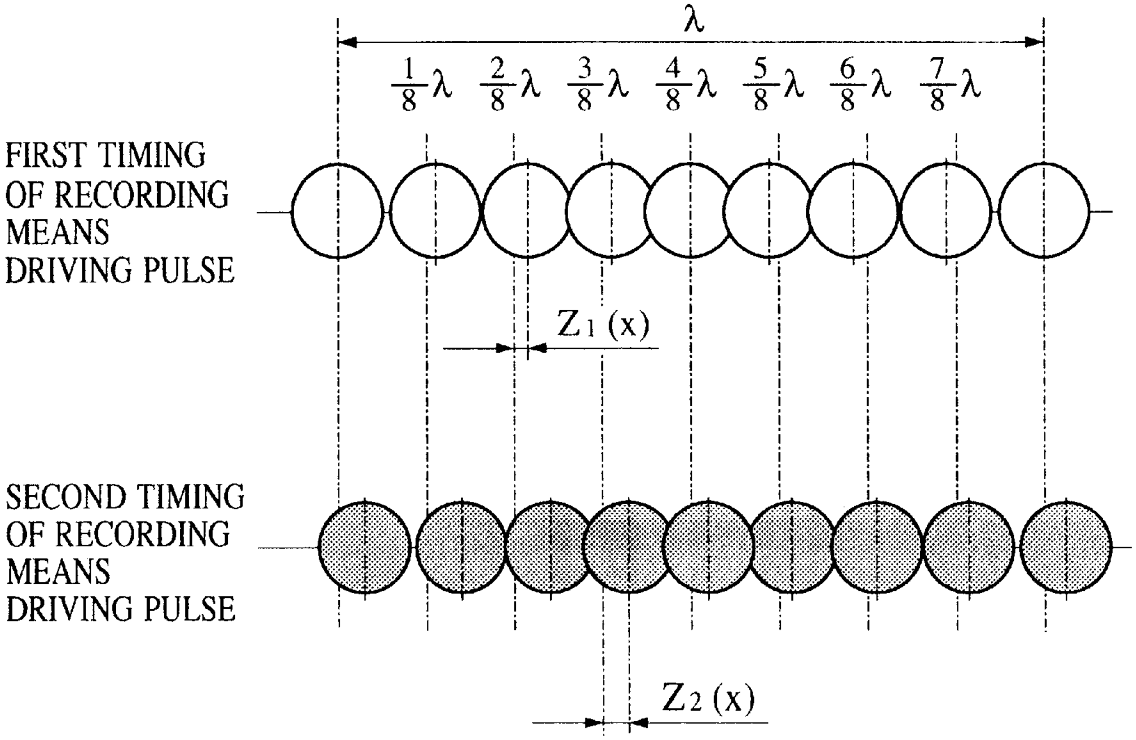
FIG. 2 is an explanatory diagram concerning the positions of dots formed according to the timing relative to a motor driving pulse employed in the first embodiment.

FIG. 2 shows deviations of record dots formed on the recording medium according to the two kinds of timing from ideal positions.

Illustrated is how record dots formed by applying a recording pulse according to the two kinds of timing are deviated from the predetermined ideal positions ($(n/8)\lambda$ where the wavelength $\lambda$ equals to 8 dots (four motor driving pulses)).

A deviation Z1(X) of each record dot formed on the recording medium according to the first timing from the ideal position $X=(n/8)\lambda$ is expressed as follows:

$$Z1(X)=A\sin(2\pi(X/\lambda))$$

where A denotes an amplitude.

A deviation Z2(X) of each record dot formed on the recording medium according to the second timing from the ideal position $X=(n/8)\lambda$ is expressed as follows:

$$Z2(X)=Z20+A\sin(2\pi(X+Z20)/\lambda)$$

where A denotes an amplitude, and Z20 denotes a distance by which the carriage is moved at an ideal speed (a quotient of a distance between two record dots or a pitch between adjoining dots by the pulse duration of a driving pulse) during a time interval $\Delta t$.

Unlike Z1(X), Z2(X) does not merely indicate a deviation of the distance Z20 but indicates the deviation of Z20 with a phase shift.

In other words, the change in the deviation from the ideal shot position does not occur synchronously between the first timing and second timing.

According to the two kinds of timing of applying the recording pulse relative to the driving pulse applied to the pulse motor serving as the carriage motor, cyclical irregularity in recording occurring in the direction of main scanning can be apparently minimized.

Figure 3:
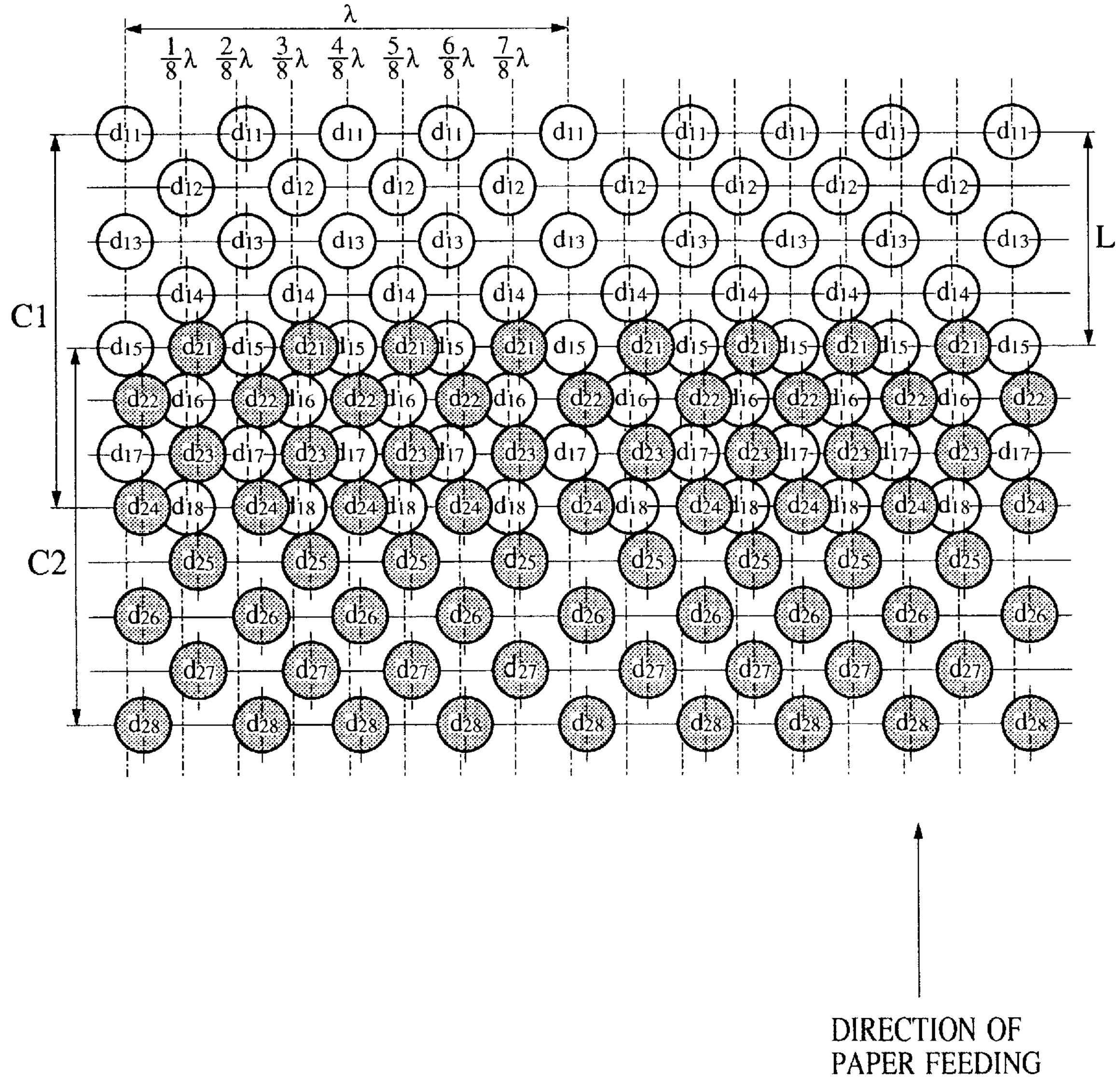
FIG. 3 is an explanatory diagram concerning an example of recording modes in which a record image is produced by performing two scans according to the timing of driving employed in the first embodiment.

FIG. 3 indicates a method of forming an array of record dots in the direction of main scanning during two main scans according to the two kinds of timing of applying the recording pulse relative to the driving pulse applied to the pulse motor serving as the carriage motor shown in FIG. 1. This method is such that record dots are formed in zigzag while being thinned during two main scans.

A head having eight recording means arranged in the direction of sub scanning is used as the recording head. In FIG. 3, C1 denotes an area in which data is recorded during the first main scan, and C2 denotes an area in which data is recorded during the second main scan.

In FIG. 3, dmn indicates record dots formed by the n-th recording means during the m-th main scan.

To begin with, the area C1 is swept in the direction of main scanning. Every second dot is formed in the directions of both main scanning and sub scanning according to the first timing (shown in FIG. 1) of applying the recording pulse relative to the driving pulse applied to the carriage motor. Thereafter, paper (that is, the recording medium) is transported by a length L covering four recording means or a half of the eight recording means in a direction of paper feeding.

Thereafter, the area C2 is swept in the direction of main scanning. Record dots that are not recorded during the main scan covering the area C1 are formed according to the second timing of applying the recording pulse relative to the driving pulse to be applied to the carriage motor (shown in FIG. 1). An array of record dots that should be formed is thus completed.

As mentioned above, record dots that should be formed in a certain area are divided into two groups to be formed in a complementary manner during two main scans. The two groups of record dots are formed according to the different kinds of timing of applying the recording pulse relative to the driving pulse applied to the carriage motor.

According to the recording method, record dots adjoining in the directions of both main scanning and sub scanning are formed while exhibiting different phase shifts relative to the ideal recording positions in the direction of main scanning. Irregularities in a record image or the drawback of the conventional apparatus that irregularity occurs cyclically can be prevented.

Figure 4:
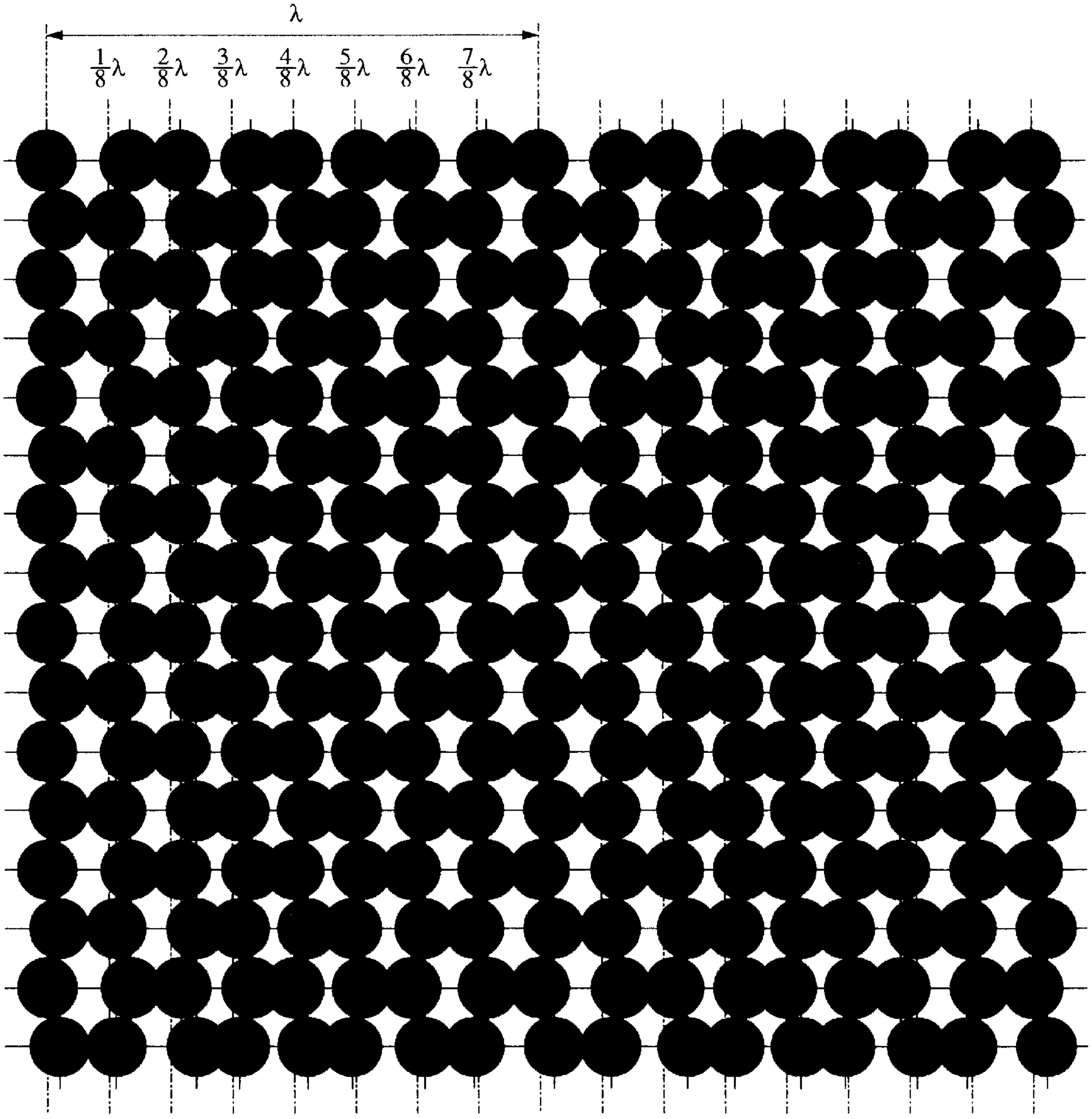
FIG. 4 is an explanatory diagram concerning a state of dots formed on a recording medium by performing the recording operation explained in conjunction with FIG. 3.

FIG. 4 shows how record dots actually formed as a result of recording are seen.

According to the second timing of applying the recording pulse relative to the driving pulse applied to the pulse motor serving as the carriage motor, the time lag $\Delta t$ should preferably be equal to or smaller than a half of the pulse duration of the recording pulse used to drive the recording means in the recording head. This is intended to maintain the linearity of formed record dots in the direction of sub scanning.

According to the present embodiment, a pulse motor is used as the carriage motor for driving the carriage. A driving pulse applied to the pulse motor is used as a signal which is generated responsively to a movement in the direction of main scanning made by the carriage and based on which the position in the direction of main scanning of the carriage can be calculated. A motor with an encoder may be used as the carriage motor, and an output signal of the encoder may be employed. Nevertheless, the same advantages as those described previously can be achieved.

Moreover, an output pulse of a linear encoder may be used as the signal which is generated responsively to a movement in the direction of main scanning made by the carriage and based on which the position in the direction of main scanning of the carriage can be calculated. Nevertheless, the same advantages as those described previously can be, needless to say, achieved. The aforesaid method will prove effective in any kind of irregularity in recording attributable to cyclical irregularity in the speed of the carriage occurring during a main scan involving the carriage.

Second Embodiment

FIG. 10 to FIG. 13 show the second embodiment of the present invention.

The configuration of the apparatus is the same as that of the preceding embodiment. The description of the configuration will therefore be omitted.

Figure 10:
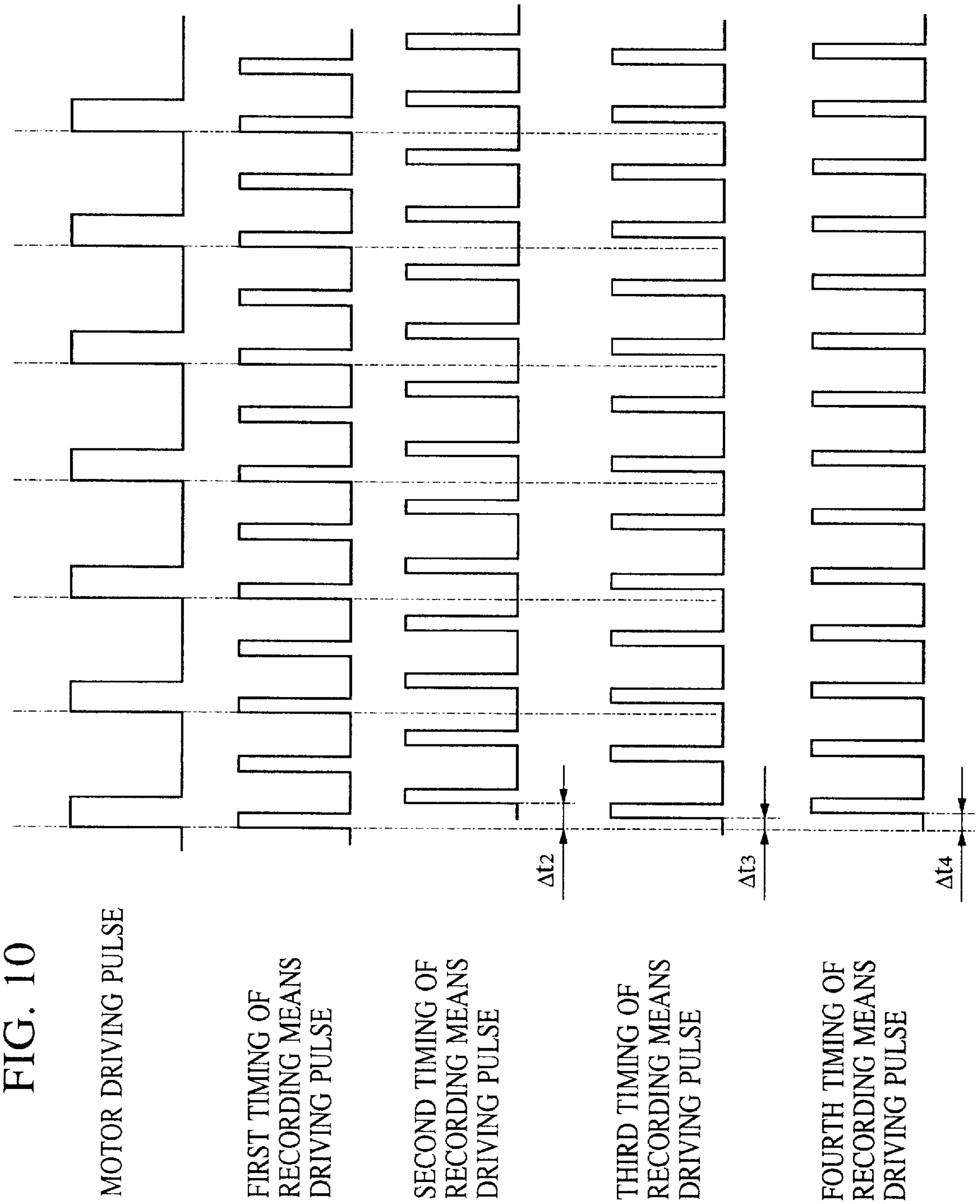
FIG. 10 shows an example of timing relative to a motor driving pulse employed in the second embodiment.

FIG. 10 shows the relationship among four kinds of timing of applying a recording pulse used to drive the recording means in the recording head relative to a driving pulse applied to the pulse motor serving as the carriage motor. As illustrated, in the previous embodiment, timing of recording is set so that the recording pulse will be applied twice to the recording means in the recording head during applications of the motor driving pulse. Specifically, while the motor is rotated by one step for enabling main scanning, the recording head can form two dots on the recording medium.

As illustrated, in the present embodiment, four kinds of timing of applying the recording pulse is set relative to the driving pulse applied to the pulse motor.

Specifically, according to the first timing of recording, the recording pulse is generated simultaneously with the motor driving pulse. The recording pulse is generated once more during generations of the motor driving pulse. Thus, two recording pulses are generated relative to one driving pulse to be applied to the carriage motor. Consequently, dots can be formed on the recording medium with a uniform distance between adjoining dots. By contrast, according to the second timing of recording, the recording pulse is generated to lag behind the driving pulse applied to the carriage motor by a time lag $\Delta t2$. The recording pulse is generated once more during generations of the motor driving pulse. Thus, two recording pulses to be applied to the recording means in the recording head are generated relative to one driving pulse to be applied to the carriage motor. Consequently, dots can be formed on the recording medium with a uniform distance between adjoining dots. Moreover, according to the third timing of recording, the recording pulse is generated to lag behind the driving pulse applied to the carriage motor by a time lag $\Delta t3$. The recording pulse is generated once more during generations of the motor driving pulse. Thus, two recording pulses are generated relative to one driving pulse to be applied to the carriage motor. Consequently, dots can be formed on the recording medium with a uniform distance between adjoining ones. Furthermore, according to the fourth timing of recording, the recording pulse is generated to lag behind the motor driving pulse by a time lag $\Delta t4$. The recording pulse is generated once more during generations of the driving pulse. Thus, two recording pulses are generated relative to one driving pulse to be applied to the carriage motor. Consequently, dots can be formed on the recording medium with a uniform distance between adjoining ones. The time lags $\Delta t2$, $\Delta t3$, and $\Delta t4$ are set to mutually different values.

Figure 11:
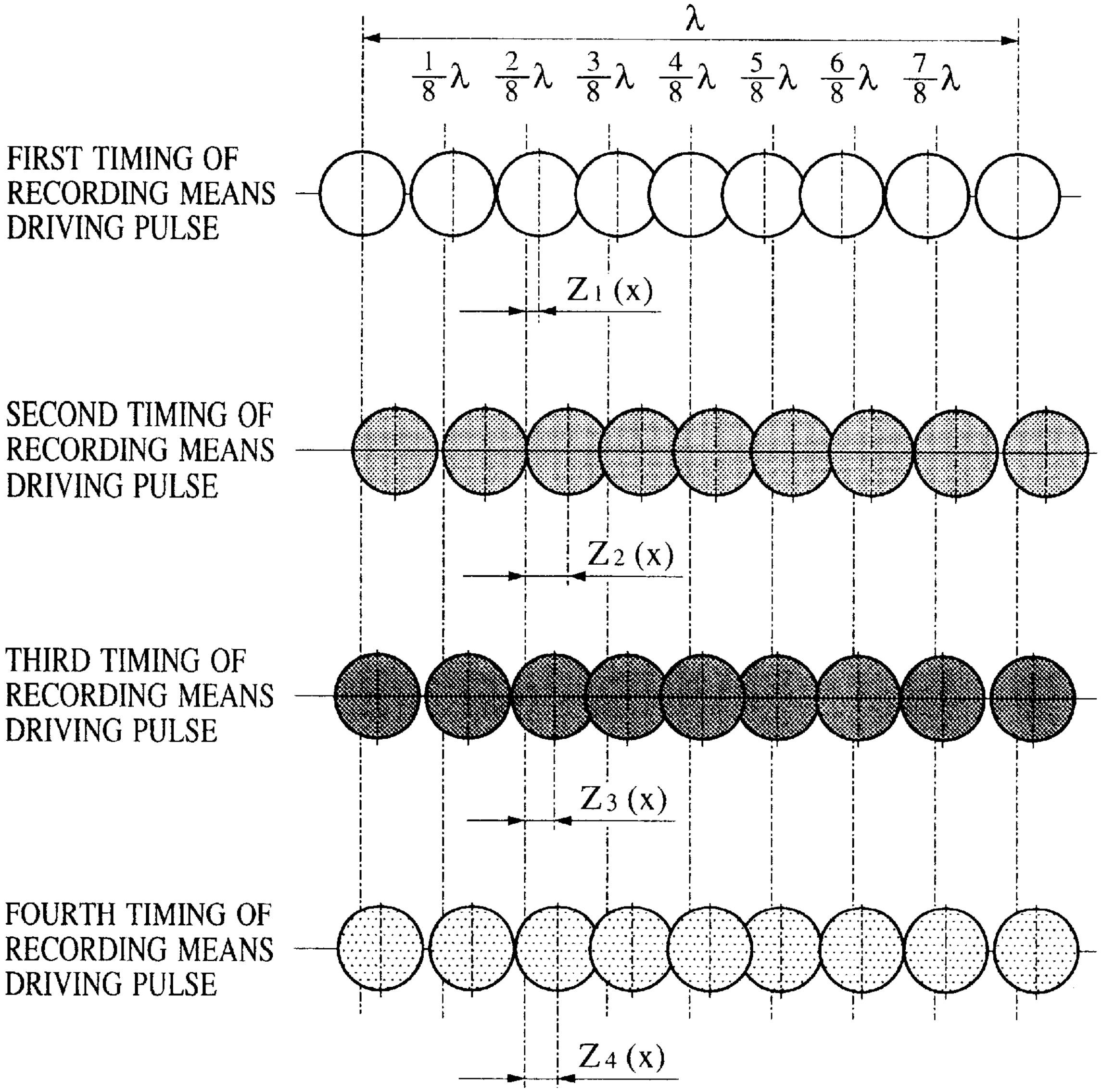
FIG. 11 is an explanatory diagram concerning positions of dots formed according to the timing relative to the motor driving pulse employed in the second embodiment.

FIG. 11 shows deviations of record dots formed on the recording medium according to the four kinds of timing from ideal positions.

Illustrated are the deviations of dots formed by applying the recording pulse according to the four kinds of timing from the predetermined ideal positions ($(n/8)\lambda$ where the wavelength $\lambda$ equals 8 dots (four motor driving pulses)).

A deviation Z1(X) of each record dot formed on the recording medium according to the first timing from an ideal position $X=(n/8)\lambda$ is expressed as follows:

$$Z1(X)=A\sin(2\pi(X/\lambda))$$

where A denotes an amplitude.

A deviation Z2(X) of each record dot formed on the recording medium according to the second timing from an ideal position $X=(n/8)\lambda$ is expressed as follows:

$$Z2(X)=Z20+A\sin(2\pi(X+Z20/\lambda))$$

where A denotes an amplitude, and Z20 denotes a distance by which the carriage is moved at an ideal speed (a quotient of a distance between two record dots or a pitch between adjoining dots by the pulse duration of the driving pulse) during a time interval $\Delta t2$.

Unlike Z1(X), Z2(X) does not merely indicate a deviation of the distance Z20 but indicates the deviation of Z20 with a phase shift.

A deviation Z3(X) of each dot formed on the recording medium according to the third timing from an ideal position $X=(n/8)\lambda$ is expressed as follows:

$$Z3(X)=Z30+A\sin(2\pi(X+Z30/\lambda))$$

where A denotes an amplitude, and Z30 denotes a distance by which the carriage is moved at an ideal speed (a quotient of a distance between two record dots or a pitch between adjoining dots by the pulse duration of the driving pulse) during a time interval $\Delta t3$.

Unlike Z1(X), Z3(X) does not merely indicate a deviation of the distance Z30 but indicates the deviation of Z30 with a phase shift.

A deviation Z4(X) of each record dot formed on the recording medium according to the fourth timing from an ideal position $X=(n/8)\lambda$ is expressed as follows:

$$Z4(X)=Z40+A\sin(2\pi(X+Z40/\lambda))$$

where A denotes an amplitude, and Z40 denotes a distance by which the carriage is moved at an ideal speed (a quotient of a distance between two record dots or a pitch between adjoining dots by the pulse duration of the driving pulse) during a time interval $\Delta t4$.

Unlike Z1(X), Z4(X) does not merely indicate a deviation of the distance Z40 but indicates the deviation of Z40 with a phase shift.

In other words, the change in the deviation from the ideal shot position does not occur synchronously among the first, second, third, and fourth timing.

Using the four kinds of timing of applying the recording pulse relative to the driving pulse applied to the pulse motor serving as the carriage motor, cyclical irregularity in recording occurring in the direction of main scanning can be apparently minimized.

Figure 12:
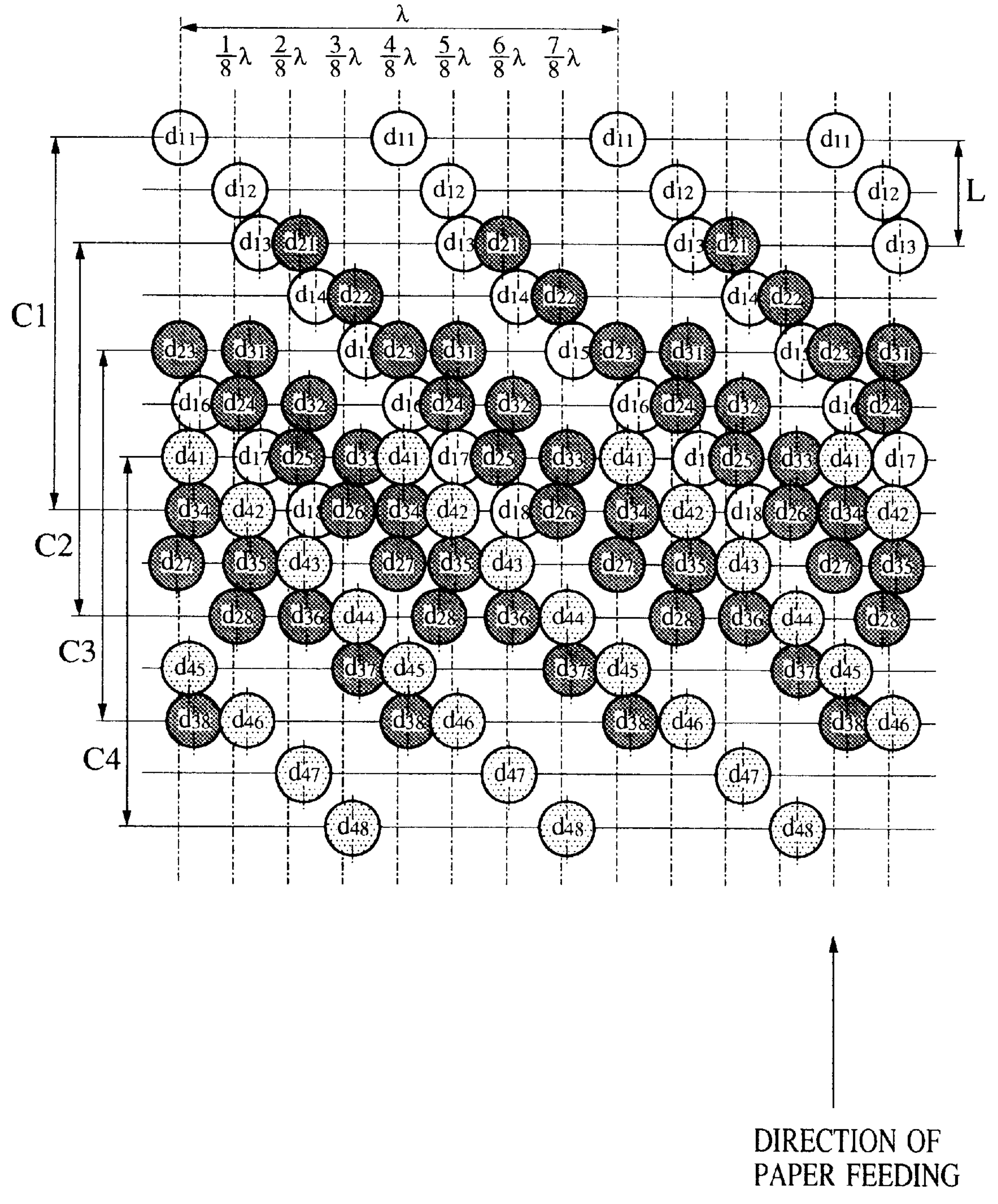
FIG. 12 is an explanatory diagram concerning an example of recording modes in which a record image is produced by performing four scans according to the timing of driving employed in the second embodiment.

FIG. 12 indicates a method of forming an array of record dots in the direction of main scanning during four main scans according to the four kinds of timing (shown in FIG. 10) of applying the recording pulse relative to the driving pulse applied to the pulse motor serving as the carriage motor. According to this method, recording is completed by forming every fifth record dot during two main scans.

A head having eight recording means arranged in the direction of sub scanning is used as the recording head. In an area C1, data is recorded during the first main scan. In an area C2, data is recorded during the second main scan. In an area C3, data is recorded during the third main scan. In an area C4, data is recorded during the fourth main scan.

In the drawing, dmn indicates record dots for.ed by the n-th recording means during the m-th main scan.

To begin with, the area C1 is swept in the direction of main scanning. Every fifth record dot is formed in the directions of both main scanning and sub scanning according to the first timing of applying the recording pulse relative to the driving pulse applied to the carriage motor (shown in FIG. 10). Thereafter, paper is transported by a length L covering two recording means or a quarter of the eight recording means in the direction of paper feeding.

Thereafter, the area C2 is swept in the direction of main scanning. As for record dots that are not formed during the main scan covering the area C1, every fifth record dot is formed in the directions of both main scanning and sub scanning according to the second timing (shown in FIG. 10) of applying the recording pulse relative to the driving pulse applied to the carriage motor. Thereafter, paper is transported by the length L covering two recording means or a quarter of the eight recording means in the direction of paper feeding.

Thereafter, the area C3 is swept in the direction of main scanning. As for record dots that are not formed during the main scans covering the areas C1 and C2, every fifth record dot is formed in the directions of both main scanning and sub scanning according to the third timing (shown in FIG. 10) of applying the recording pulse relative to the driving pulse applied to the carriage motor. Paper is then transported by the length L covering two recording means or a quarter of the eight recording means in the direction of paper feeding.

Thereafter, the area C4 is swept in the direction of main scanning. As for record dots that are not formed during the main scans covering the areas C1, C2, and C3, every fifth record dot is formed in the directions of both main scanning and sub scanning according to the fourth timing (shown in FIG. 10) of applying the recording signal relative to the driving pulse applied to the carriage motor. Thus, an array of record dots that should be formed is completed.

As mentioned above, record dots that should be formed in a certain area are divided into four groups so that all the record dots will be formed by performing four main scans. The recording pulse is applied to the recording means according to the different kinds of timing relative to the driving pulse applied to the carriage motor.

According to the foregoing recording method, record dots adjoining in the directions of both main scanning and sub scanning are formed while deviated from ideal positions in the direction of main scanning by mutually different phase shifts. Irregularities in an image or the drawback of the conventional apparatus that irregularity occurs cyclically in the direction of main scanning can be prevented.

Figure 13:
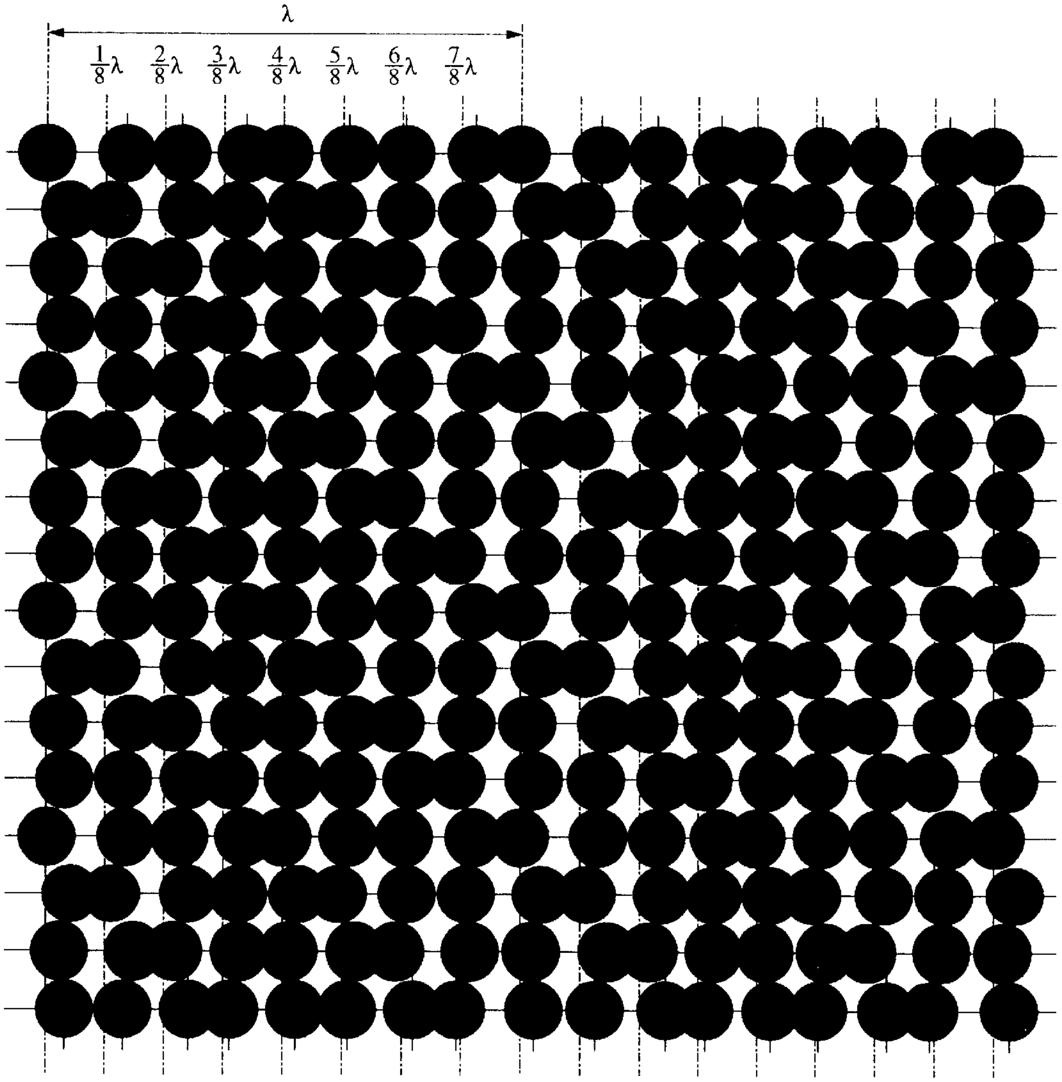
FIG. 13 is an explanatory diagram concerning a state of dots formed on a recording medium by performing the recording operation explained in conjunction with FIG. 12.
Figure 14:
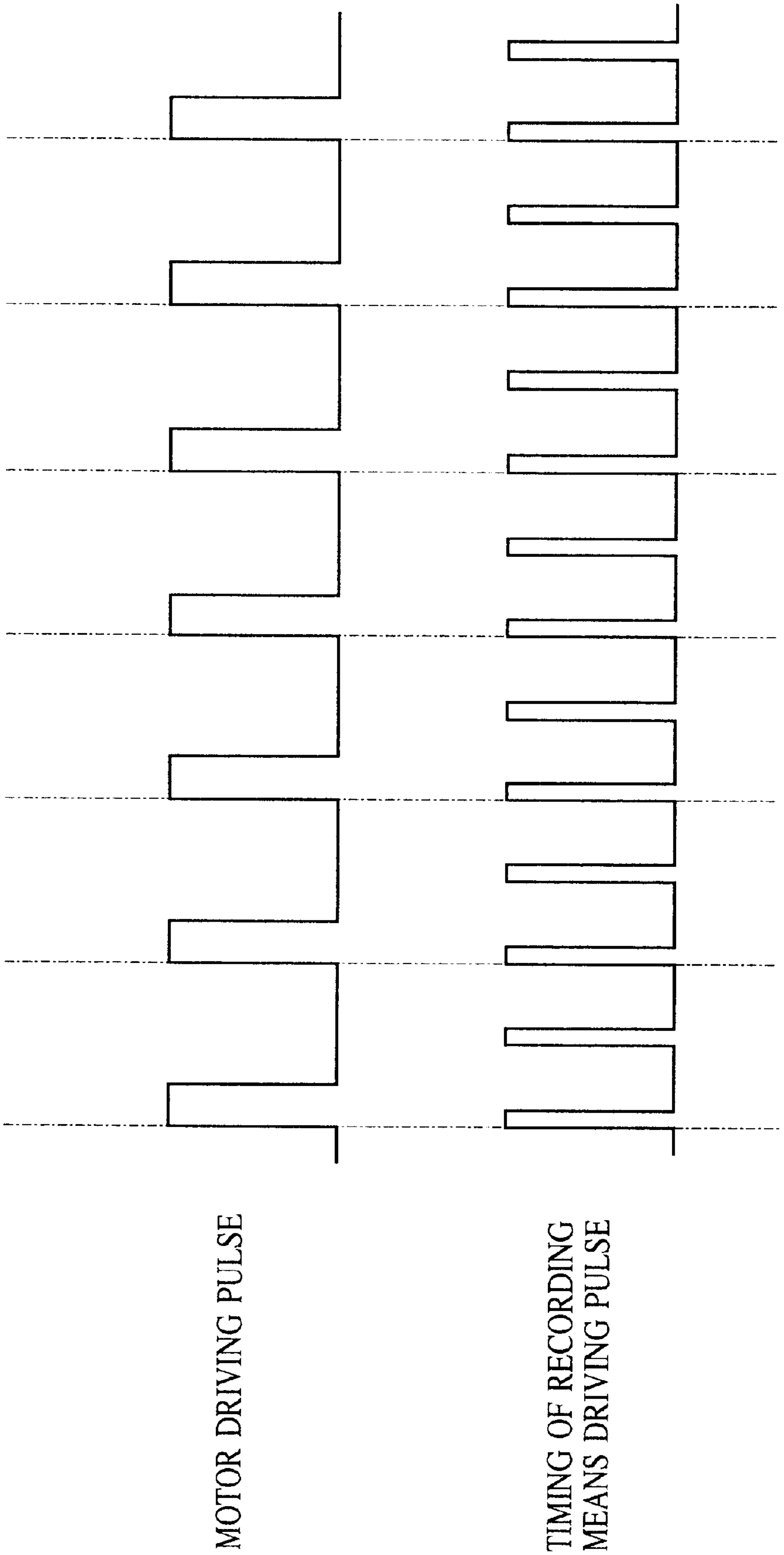
FIG. 14 is an explanatory diagram concerning timing relative to a driving pulse applied to a pulse motor used as a carriage motor.
Figure 15:
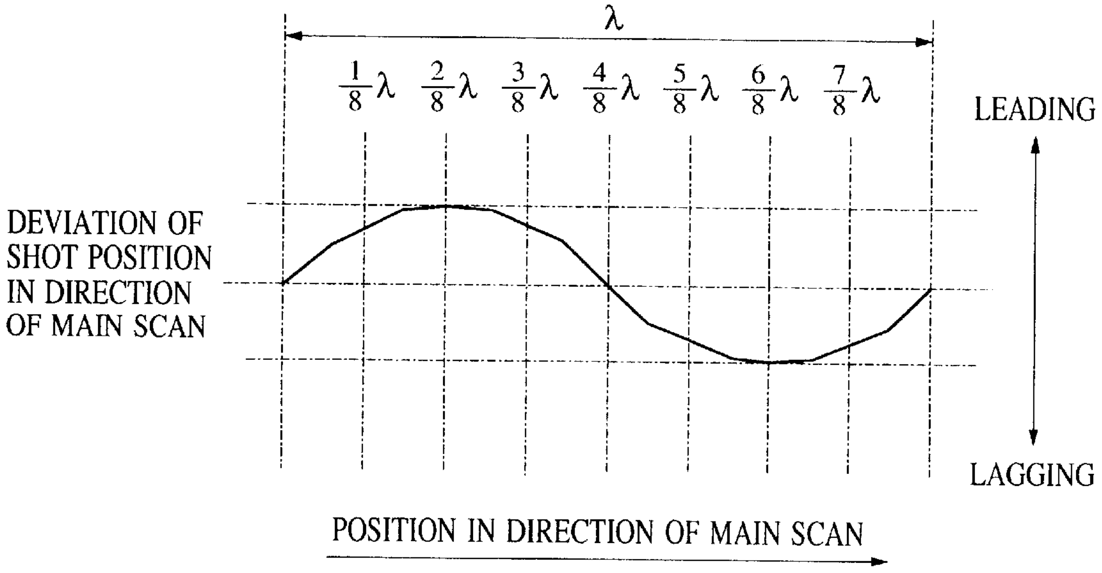
FIG. 15 is an explanatory diagram concerning a state in which a dot formed by a conventional recording apparatus is deviated from a predetermined position.
Figure 16:
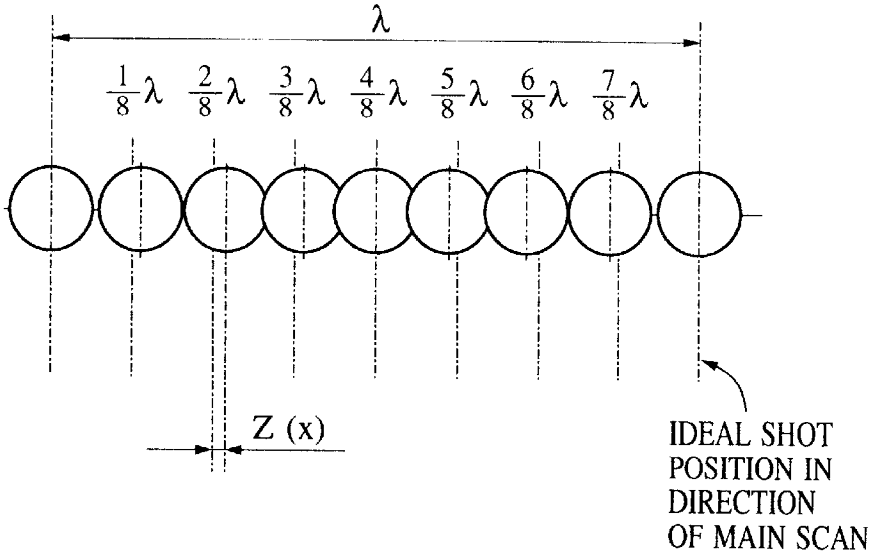
FIG. 16 is an explanatory diagram concerning a state in which dots are deviated from predetermined positions on a recording medium.
Figure 17:
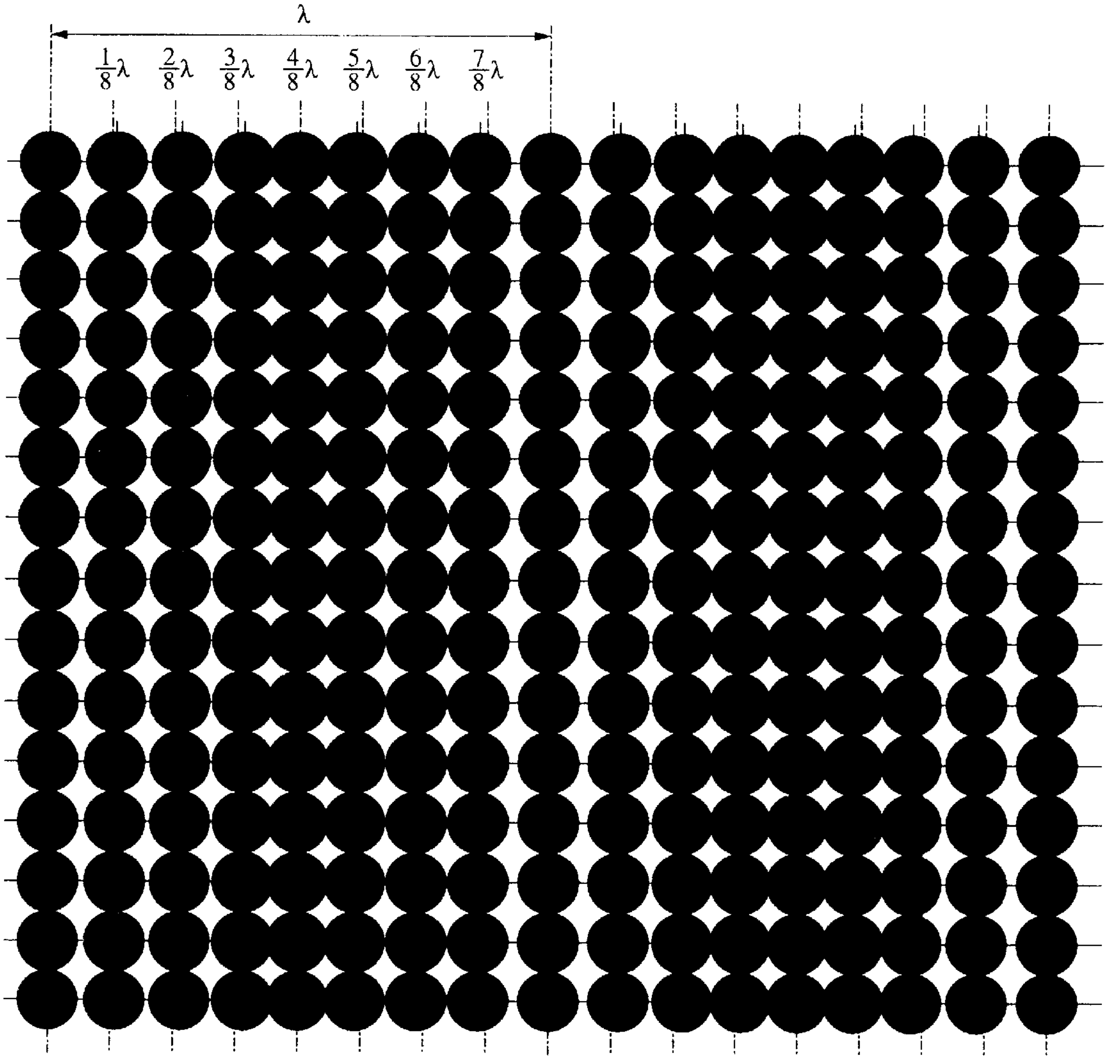
FIG. 17 is an explanatory diagram concerning a record image produced in the state explained in conjunction with FIG. 16.

FIG. 13 shows how record dots actually formed as a result of recording are seen.

Incidentally, when the recording pulse is applied according to the second, third, and fourth timing, the recording pulse lags behind the driving pulse applied to the pulse motor serving as the carriage motor by the time lags Δt2, Δt3, and Δt4 respectively. The time lags should preferably be equal to or smaller than a half of the pulse duration of the recording pulse. This is intended to maintain the linearity of formed record dots in the direction of sub scanning.

Moreover, the relationship among Δt2, Δt3, and Δt4 should be such that Δt3 is the smallest. When this relationship is established, the linearity of formed record dots in the direction of sub scanning can be maintained more reliably.

In the present embodiment, a pulse motor is used as the carriage motor for driving the carriage. A driving pulse applied to the pulse motor is used as a signal which is generated responsively to a movement in the direction of main scanning made by the carriage and based on which the position in the direction of main scanning of the carriage can be calculated. Alternatively, a motor with an encoder may be used as the carriage motor, and an output signal of the encoder may be employed. The same advantages as those mentioned above can still be obtained.

Moreover, an output pulse of a linear encoder may be used as a signal which is generated responsively to a movement in the direction of main scanning made by the carriage and based on which position in the direction of main scanning of the carriage can be calculated. The same advantages as those mentioned above can still be obtained.

The aforesaid method will prove effective in any kind of irregularity in recording attributable to irregularity in the speed of the carriage occurring cyclically during a main scan involving the carriage.

As described so far, according to the present invention, a plurality of kinds of timing, according to which a recording signal used to drive the recording means is generated after generation of a position signal based on which position in the direction of main scanning of the carriage can be calculated, is set relative to the signal. Any of the kinds of timing is selected in order to control the recording signal for each main scan involving the carriage. Consequently, irregularity in recording that appears as streaks in the direction of main scanning can be suppressed without a rise in costs. Excellent record images can be produced with high quality.

What is claimed is:

1. A recording apparatus, comprising:

a carriage for scanning a recording medium in a direction of main scanning with a recording head, in which a plurality of recording means for forming record dots on said recording medium is arranged, mounted thereon;

a carriage motor for driving said carriage;

a transport mechanism for transporting the recording medium in a direction of sub scanning;

generating means for generating a position signal corresponding to movement of said carriage in the direction of main scanning;

control means, capable of generating a plurality of kinds of timing with different phases set relative to the position signal, for selecting timing with a phase which is different between at least two main scans of said carriage from said plurality of kinds of timing, and for outputting a recording signal based on the selected timing; and recording means for recording based on said recording signal by driving said plurality of recording means.

2. A recording apparatus according to claim 1, wherein said carriage motor is a pulse motor, and wherein a driving pulse applied to said carriage motor is used as said position signal generated by said generating means.

3. A recording apparatus according to claim 1, wherein said carriage motor is a motor with an encoder, and wherein an output pulse of said encoder is used as said position signal generated by said generating means.

4. A recording apparatus according to claim 1, wherein said generating means comprises a linear encoder.

5. A recording apparatus according to claim 1, wherein said plurality of kinds of timing with different phases are timings which are offset by predetermined times from timing ideal for recording.

6. A recording apparatus, comprising:

a carriage for scanning a recording medium in a direction of main scanning with a recording head, in which a plurality of recording means for forming record dots on said recording medium is arranged, mounted thereon;

a carriage motor for driving said carriage;

a transport mechanism for transporting the recording medium in a direction of sub scanning;

generating means for generating a position signal corresponding to movement of said carriage in the direction of main scanning;

recording control means capable of recording in a recording mode for completing a recording image to be formed in the direction of main scanning by repeating main scanning a plurality of times in the direction of main scanning;

control means, capable of generating a plurality of kinds of timing with different phases set relative to the position signal, for selecting timing with a phase which is different between at least two main scans of said carriage from said plurality of kinds of timing, and for outputting a recording signal based on the selected timing; and recording means for recording based on said recording signal by driving said plurality of recording means, wherein said selection is performed when recording is done in said recording mode.

7. A recording apparatus according to claim 6, wherein said carriage motor is a pulse motor, and wherein a driving pulse applied to said carriage motor is used as said position signal generated by said generating means.

8. A recording apparatus according to claim 6, wherein said carriage motor is a motor with an encoder, and wherein an output pulse of said encoder is used as said position signal generated by said generating means.

9. A recording apparatus according to claim 6, wherein said generating means comprises a linear encoder.

10. A recording apparatus according to claim 6, wherein a time interval from the instant said position signal is generated to the instant said recording signal is generated is shorter than one-half of a time interval calculated by dividing the pulse duration of said position signal by the number of recording signals generated during generations of said position signal.

11. A recording apparatus according to claim 6, wherein said carriage motor is a pulse motor, and wherein a driving pulse applied to said carriage motor is used as said position signal generated by said generating means.

12. A recording apparatus according to claim 6, wherein said carriage motor is a motor with an encoder, and wherein an output pulse of said encoder is used as said position signal generated by said generating means.

13. A recording apparatus according to claim 6, wherein said generating means comprises a linear encoder.

14. A recording apparatus according to claim 6, wherein said selection is performed at each of said plurality of times of scanning.

15. A recording apparatus according to claim 6, wherein said control means generates one or a plurality of said recording signals between position signals.

16. A recording apparatus according to claim 6, wherein said plurality of kinds of timing with different phases are timings which are offset by predetermined times from timing ideal for recording.

17. A method of controlling a recording apparatus, comprising the steps of:

providing the recording apparatus including a carriage for scanning a recording medium in a direction of main scanning with a recording head, in which a plurality of recording means for forming record dots on said recording medium is arranged, mounted thereon, a carriage motor for driving the carriage, a transport mechanism for transporting the recording medium in a direction of sub scanning, generating means for generating a position signal corresponding to movement of the carriage in the direction of main scanning, recording signal control means for calculating, based on the position signal, the position of the recording head in the direction of main scanning, and for generating a recording signal used to drive the plurality of recording means; and selecting one of a plurality of kinds of timing with different phases in order to generate the recording signal during the main scan of the carriage, wherein the plurality of kinds of timing with different phases are set relative to the position signal, and wherein the recording signal is generated according to the plurality of kinds of timing after generation of the position signal.

* * * * *

UNITED STATES PATENT AND TRADEMARK OFFICE
CERTIFICATE OF CORRECTION

PATENT NO. : 6,614,554 B1
DATED : September 2, 2003
INVENTOR(S) : Yokoi

It is certified that error appears in the above-identified patent and that said Letters Patent is hereby corrected as shown below:

Column 11,
Line 16, "for.ed" should read -- formed --.

Signed and Sealed this

Sixth Day of January, 2004

JAMES E. ROGAN
*Director of the United States Patent and Trademark Office*